United States Patent [19]

Mayo et al.

[11] Patent Number: 5,153,286
[45] Date of Patent: Oct. 6, 1992

[54] PROCESSES FOR THE PREPARATION OF PARTICLES

[75] Inventors: James D. Mayo, Toronto, Canada; Christine C. Lyons, Webster, N.Y.; Melvin D. Croucher, Oakville, Canada

[73] Assignee: Xerox Corporation, Stamford, Conn.

[21] Appl. No.: 670,652

[22] Filed: Mar. 18, 1991

[51] Int. Cl.$^5$ .............................................. C08F 2/20
[52] U.S. Cl. .................................... 526/209; 526/212; 526/229; 526/328
[58] Field of Search ............... 526/229, 328, 209, 212; 428/402

[56] References Cited

U.S. PATENT DOCUMENTS

| | | | |
|---|---|---|---|
| 2,643,995 | 6/1953 | Park | 526/229 |
| 3,590,000 | 6/1971 | Palermiti et al. | 252/62.1 |
| 4,233,387 | 11/1980 | Mammino et al. | 430/137 |
| 4,286,037 | 8/1981 | Hectors et al. | 430/107 |
| 4,426,501 | 1/1984 | Khan | 526/206 |
| 4,777,104 | 10/1988 | Matsumoto et al. | 430/109 |
| 4,935,326 | 6/1990 | Creatura et al. | 430/108 |
| 4,935,469 | 6/1990 | Akasaki | 526/328 X |
| 4,937,166 | 6/1990 | Creatura et al. | 430/108 |
| 4,943,505 | 7/1990 | Aoki et al. | 430/109 |

OTHER PUBLICATIONS

Hawley's Condensed Chemical Dictionary, 11th Ed. VanNostrand, New York, 1987; p. 959.
J. Brandrup & E. H. Immergut, Eds., Polymer Handbook, 2nd Ed., Wiley, New York, 1975, pp. III-140-III--155.Blackley, D. C., "Emulsion Polymerisation", pp. 167-173 Wiley, New York, 1975.
Blackley, D. C., "Emulsion Polymerization", pp. 167-173 Wiley, New York, 1975.

*Primary Examiner*—Joseph L. Schofer
*Assistant Examiner*—M. Nagumo
*Attorney, Agent, or Firm*—E. O. Palazzo

[57] ABSTRACT

A process for the preparation of polymers which comprises dissolving an emulsifier in a solvent, followed by heating the mixture formed; adding to the mixture an alkali persulfate initiator dissolved in a solvent; subsequently adding monomer thereto, which monomer is not miscible with said solvent, and wherein the monomer is added after a period of time of from about 1 second to about 60 minutes has elapsed after the addition of said dissolved initiator; and thereafter effecting polymerization.

30 Claims, No Drawings

PROCESSES FOR THE PREPARATION OF PARTICLES

BACKGROUND OF THE INVENTION

This invention is generally directed to processes for the preparation of particles, and more specifically, the present invention relates to processes for the preparation of polymers that can, for example, be selected as carrier coatings for xerographic developer compositions. In one embodiment, the process of the present invention relates to the preparation of polymers, such as polymethylmethacrylate by a modified aqueous emulsion polymerization wherein an emulsifier such as a block copolymer is selected as an emulsifier, and an alkali persulfate, such as potassium persulfate, is utilized as an initiator. The polymers obtained can be subjected to purification, and subsequently isolation by, for example, known methods such as freeze drying. The polymers obtained can be selected as carrier coatings, which coated carrier particles can be prepared by a dry powder process. The carrier particles obtained can be comprised of a core with coating thereover generated from a mixture of polymers that are not in close proximity thereto in the triboelectric series. These carrier particles can be prepared by a dry coating process wherein a mixture of certain polymers is applied to the carrier enabling insulating particles with ralatively constant conductivity parameters; and also wherein the triboelectric charge on the carrier can vary significantly depending on the coatings selected. Developer compositions comprised of the carrier particles prepared by the aforementioned dry coating process are useful in electrostatographic or electrophotographic imaging systems, especially xerographic imaging and printing processes. Additionally, developer compositions comprised of substantially insulating carrier particles are useful in imaging methods wherein relatively constant conductivity parameters are desired. Furthermore, in the aforementioned imaging processes the triboelectric charge on the carrier particles can be preselected depending on the polymer composition applied to the carrier core. The carrier particles with coatings thereover, wherein at least one of the coatings is comprised of the polymers obtained, with the processes of the present invention are illustrated in U.S. Pat. Nos. 4,937,166, and 4,935,326, the disclosures of which are totally incorporated herein by reference.

Polymer coatings are commercially available, for example polymethylmethacrylate is available from Soken Chemical and Engineering Company Limited. The aforementioned polymer can be prepared by, for example, known soap-free emulsion polymerization. In this process, there can be selected a small amount (about 1 percent) of acrylic acid which acts as an emulsifier. This water soluble monomer forms micelles where polymerization takes place, followed by grafting to the formed polymer, and functions, it is believed, as a steric stabilizer. There results a very well dispersed network of polymer particles which are very difficult to isolate. To accomplish this isolation, a small amount of zinc acetate is added to the dispersed network which serves to aggregate the particles, allowing for washing and drying. Isolation is then accomplished by jetting the aggregated particles, such that individual submicron polymer particles result, wherein the stabilizer, such as poly(acrylic acid), is not removed therefrom. Also, some zinc acetate remains in the product and yields can be very low (about 20 percent).

Carrier particles for use in the development of electrostatic latent images are described in many patents including, for example, U.S. Pat. No. 3,590,000. These carrier particles may be comprised of various cores, including steel, with a coating thereover of, for example, fluoropolymers, and terpolymers of styrene, methacrylate, silane compounds, a mixture of polymers not in close proximity in the triboelectric series, and the like. Recent efforts have focused on the attainment of coatings for carrier particles, for the purpose of improving development quality; and also to permit particles that can be recycled, and that do not adversely effect the imaging member in any substantial manner. A number of the present commercial coatings can deteriorate rapidly, especially when selected for a continuous xerographic process where the entire coating may separate from the carrier core in the form of chips or flakes, and fail upon impact, or abrasive contact with machine parts and other carrier particles. These flakes or chips, which cannot generally be reclaimed from the developer mixture, have an adverse effect on the triboelectric charging characteristics of the carrier particles thereby providing images with lower resolution in comparison to those compositions wherein the carrier coatings are retained on the surface of the core substrate. Further, another problem encountered with some prior art carrier coatings resides in fluctuating triboelectric charging characteristics, particularly with changes in relative humidity. The aforementioned modification in triboelectric charging characteristics provides developed images of lower quality, and with background deposits.

There are also illustrated in U.S. Pat. No. 4,233,387, the disclosure of which is totally incorporated herein by reference, coated carrier components for electrostatographic developer mixtures comprised of finely divided toner particles clinging to the surface of the carrier particles. Specifically, there are disclosed in this patent coated carrier particles obtained by mixing carrier core particles of an average diameter of from between about 30 microns to about 1,000 microns with from about 0.05 percent to about 3.0 percent by weight, based on the weight of the coated carrier particles, of thermoplastic resin particles. The resulting mixture is then dry blended until the thermoplastic resin particles adhere to the carrier core by mechanical impaction, and/or electrostatic attraction. Thereafter, the mixture is heated to a temperature of from about 320° F. to about 650° F. for a period of 20 minutes to about 120 minutes enabling the thermoplastic resin particles to melt and fuse on the carrier core.

Thus, for example, there can be formulated developers with conductivities of from about $10^{-6}$ mho $(cm)^{-1}$ to about $10^{-17}$ mho $(cm)^{-1}$ as determined in a magnetic brush conducting cell; and triboelectric charging values of from about a $-8$ to a $-80$ microcoulombs per gram on the carrier particles as determined by the known Faraday Cage technique, and wherein the carrier contains a first and second polymer coating, which polymers may be obtained with the processes of the present invention. Developers can be formulated with constant conductivity values with different triboelectric charging characteristics by, for example, maintaining the same coating weight on the carrier particles and changing the polymer coating ratios. Similarly, there can be formulated developer compositions wherein constant triboelectric charging values are achieved and the conductivities are altered by retaining the polymer ratio coating constant and modifying the coating weight for the carrier particles.

Other patents of interest include U.S. Pat. No. 3,939,086, which teaches steel carrier beads with polyethylene coatings, see column 6; U.S. Pat. No. 4,264,697, which discloses dry coating and fusing processes; and U.S. Pat. Nos. 3,533,835; 3,658,500; 3,798,167; 3,918,968; 3,922,382; 4,238,558; 4,310,611; 4,397,935 and 4,434,220.

In a patentability search report, the following prior art was recited: U.S. Pat. No. 4,286,037, which discloses the preparation of thermoplastic resin particles of a suitable size by coagulating an aqueous resin solution that contains one of the ions required for forming a quaternary ammonium salt in a coagulated liquid containing the other said ions, see the Abstract; also note column 5, especially line 35, wherein potassium persulfate, or a peroxide is disclosed as a polymerization initiator; and column 6, especially lines 47 to 51; and as some background interest U.S. Pat. Nos. 4,777,104, and 4,943,505.

SUMMARY OF THE INVENTION

It is a feature of the present invention to provide processes for the preparation of polymer particles.

In another feature of the present invention there are provided processes for the preparation of polymer particles, such as polymethlmethacrylate, and polyvinylidene fluoride that can be selected as a carrier coating.

In yet another feature of the present invention there are provided processes for the preparation of submicron polymers, that is polymers with an average diameter of, for example, from about 0.5 to about 1 micron as determined by known techniques, such as SEM.

In yet another feature of the present invention there are provided processes for the preparation of polymer particles with a weight average molecular weight of from about 300,000 to about 750,000.

Further, in another feature of the present invention there are provided economical processes for the preparation of submicron polymers, that is with an average diameter of, for example, from about 0.3 to about 1 micron, and wherein there is selected as the process initiator potassium persulfate.

Moreover, in another feature of the present invention there are provided processes for the preparation of discrete particles which, when isolated by, for example, freeze drying can be coated singularly or together with other polymers on carrier beads to yield a uniform layer of not more than 1 micron in thickness, and preferably from about 0.8 to about 1.2 microns.

Also, in another feature of the present invention there are provided processes for the preparation of submicron polymethylacrylate particles, from about 0.3 micron to about 1.0 micron, which when mixed with, for example, a poly(vinylidene fluoride), such as KYNAR ®, in the appropriate amount of from about 80 percent PMMA/20 percent KYNAR ® to about 40 percent PMMA/60 percent KYNAR ®, and preferably from about 65 percent PMMA/35 percent KYNAR ®; and then coated onto carrier beads, enable acceptable toner triboelectric characteristics of from about 10 to about 40 microcoulombs per gram, and preferably about 20 microcoulombs per gram for use as a toner carrier.

Another feature of the present invention resides in the preparation of polymers of a controlled molecular weight and of a certain average particle diameter wherein the time lapse subsequent to the addition of a dissolved alkali persulfate initiator solution is from about 1 second to about 60 minutes, preferably from about 5 to about 30 minutes, and more preferably about 20 minutes.

Additionally, in another feature of the present invention there are provided processes for the preparation of polymers by emulsion polymerization wherein the elapsed time for the addition of monomer after the addition of initiator solution is controlled, thereby enabling submicron particles of a desired selected weight average molecular weight.

These and other features of the present invention can be accomplished by providing processes for the preparation of polymers. In one embodiment, the process of the present invention comprises the formation of an aqueous phase obtained by dissolving an emulsifier in a solvent, such as an aliphatic alcohol or water; heating the mixture; adding an alkali persulfate initiator, such as potassium persulfate; subsequently, and at an effective selective time period adding monomer; and thereafter accomplishing polymerization. Polymerization can be effected by heating to, for example, a temperature of from about 50° to about 90° C., and preferably from about 60° to about 75° C.

In embodiments, the present invention is directed to a process for the preparation of polymers which comprises dissolving an emulsifier in a solvent, followed by heating the mixture formed; adding to the mixture an alkali persulfate initiator dissolved in a solvent; subsequently adding monomer thereto, which monomer is not miscible, or substantially imiscible with said solvent, and wherein the monomer is added after a period of time of from about 1 second to about 60 minutes, and more specifically from about 5 minutes to about 30 minutes has elapsed the addition of said dissolved initiator; and thereafter effecting polymerization.

In an embodiment of the present invention, subsequent to the addition of an alkali persulfate initiator solution, an effective re-equilibrium time delay period of, for example, from about 1 second to about 60 minutes, and more specifically from about 5 minutes to about 30 minutes, is selected, and subsequently there is added the monomer thereto followed by effecting polymerization as illustrated herein. In an embodiment, it has been determined that there is a temperature drop of, for example, from about 10° C. when the initiator solution is added to the hot emulsifier solution at a temperature of from about 70° C., however, recovery of the aforementioned temperature loss occurs over a short perior of time, that is from about 8 to about 10 minutes. The reaction is then allowed to proceed for an effective period of time, for example from about 1 hour to about 6 hours, and preferably about 2 hours at an effective temperature of from, for example, about 50° C. to about 90° C., and preferably about 70° C. The resulting milky white mixture is then cooled to room temperature, 25° C., and divided into equal portions, about 4, which are placed in centrifuge bottles. An alcohol, such as methanol, ethanol and the like, is then added to each bottle such that the volume of methanol exceeds the volume of polymer solution by at least a factor of 5 to 1. Each mixture is then centrifuged at a speed of about 3,000 to about 10,000, and preferably about 5,000 RPM for about 7 to about 15, and preferably about 10 minutes, and the solvent alcohol decanted off by pouring. Each bottle is then filled with fresh solvent, like methanol, such that the amount of solids, excludes solvent, contained therein is from about 2 percent to about 20 percent and preferably about 5 percent. The particles are then redispersed in the fresh solvent by blending with a Polytron for a period of about 2 minutes, or until the mixture appears homogeneous. Centrifugation is then repeated. This process, dispersion of the solids in fresh solvent followed by centrifugation, is then repeated three times using deionized water as solvent. The particles are finally redispersed by Polytron in a minimal amount of water, such that the amount of solids is from about 20 percent to about 50 percent and preferably about 30 percent. This solution is then dried by known methods, for example freeze drying.

One embodiment of the present invention comprises dissolving an emulsifier (1.875 grams), such as PLURONIC TM F-68, available from BASF, in deionized water (75 grams) in a 250 milliliter round-bottom three necked flask fitted with water-cooled condenser, nitrogen gas inlet and mechanical stirring set at a speed of 150 RPM, which flask was submerged in an oil bath set at a temperature of 70° C. The resulting mixture was stirred at 150 RPM for 30 minutes, allowing the mixture to attain a temperature of 70° C., and then a mixture of an initiator, such as potassium persulfate (1.0 gram), available from BASF, dissolved in a solvent like deionized water (25 grams), was added in one portion and stirred 20 minutes. At this time, a monomer, such as methyl methacrylate (99 percent) (23.125 grams), available from Aldrich Chemical Company, which was itself at 25° C., was added in one portion to the reaction vessel containing the aforementioned components. Stirring was continued for two hours from the time that the monomer was added, and the reaction was then cooled to 25° C. The contents of the flask were then divided into four equal portions of about 30 milliliters by pouring into four plastic 250 milliliter centrifuge bottles. Each bottle was then filled with 150 milliliters of solvent such as methanol and centrifugation initiated for a period of 10 minutes at a mixing speed of 5,000 RPM. The white solids, now pressed on the bottom of each of the centrifuge bottles, were isolated by decanting away the supernatant liquid. Each bottle was then filled with 150 milliliters of fresh methanol and the caked solid redispersed by mixing with a Polytron homogenizer for 2 minutes until a homogeneous dispersion was observed. After centrifuging and decanting the methanol, each bottle was filled with 150 milliliters of deionized water, the solid redispersed by homogenizer, and centrifugation initiated for 15 minutes at 5,000 RPM. The cycle of dispersion, centrifugation, and decanting was accomplished a total of two times using methanol and three times using deionized water. At this time, the contents of the four bottles were combined and redispersed by homogenizer in a total of 70 milliliters of deionized water. A solid polymer polymethylmethacrylate was isolated by freeze drying to provide 17 grams (75 percent) of a dry white powder. Particle size was measured by size average of not less than 20 particles as seen on a SEM microphotograph and a caliper, and determined to be 1 μm for the polymethylmethacrylate. Weight average molecular weight was found to be 482,000, and number average molecular weight was 126,000 for the polymethylmethacrylate.

The product polymer can be isolated by a number of known methods, such as filtration through a fine porosity, from about 4 to about 8 microns in diameter, sintered glass funnel, or more preferably by consecutive washings with methanol and then water, completed as two separate washings with methanol and three separate washings with water, such that the volume of solvent used is in at least a five-fold excess of the amount of solids present, and decanting by pouring off the supernatant liquid after centrifugation. Also, for filtration there can be selected a tangential filtration apparatus available from Millipore Company.

Particle size was measured directly from SEM photographs of the polymer product and with a caliper; and the average diameter thereof was provided from a measurement of at least 20 polymer product particles.

Weight average molecular weights of, for example, from about 300,000 to about 750,000 of the polymer product was measured using a Hewlett Packard 1090 Liquid Chromotograph TM interfaced with a Hewlett Packard 1047A TM refractive index detector against a set of polymethacrylate internal standards available from Scientific Polymer Products. A calibration curve was prepared using six standards having narrow weight average molecular weight distributions ranging from 26,700 to 713,400. The aforementioned molecular weights can be controlled by, for example, the concentration of reactive components and particularly the initiator; for example, an increase in initiator concentration can result in a decrease in molecular weight of the polymer product while an increase in the emulsifier concentration can result in a decrease in particle size. For the aforementioned embodiment, the re-equilibrium time can be, for example, from about 5 minutes to about 30 minutes.

In embodiments of the present invention, the addition time (equilibrium time) or time lapse between the addition of dissolved initiator comprised of an alkali persulfate dissolved in a solvent, such as water and the like, and the addition of miscible monomer determines the molecular weight average of the polymer product, thus the aforementioned molecular weight can be controlled by varying the time lapse. Time lapses include, for example, from about 1 second to about 60 minutes, and preferably from about 5 minutes to about 30 minutes, and more preferably in an embodiment about 20 minutes. More specifically, weight average molecular weights of polymer product, such as polymethylacrylate, after known freeze drying processes, which weights were determined by liquid chromotography with a Hewlett Packard 1090 TM liquid chromatograph interfaced with a Hewlett Packard 1047A TM refractive index detector, were from about 500,000 to about 750,000 for a time lapse addition time of from about 15 minutes to about 5 minutes. Similarly, the average diameter particle size of the polymer product, which size was measured from SEM micrographs, average of 20 polymer particles on SEM, followed by measurement with a caliper, can be controlled. In embodiments of the present invention for an elapsed addition time of from about 5 to about 15 minutes after the addition of the initiator solution, the average particle diameter of the polymer product like polymethacrylate was from about 0.1 to about 0.6 micron. In three specific embodiments of the present invention for elapsed times of 10, 15, and 20 minutes, respectively, the average diameter of the product, such as polymethylacrylate and molecular weights, were as follows: 0.29 micron with a weight average molecular weight of 627,000; 0.51 micron with a weight average molecular weight of 539,000; and 0.98 micron with a weight average molecular weight of 482,000.

A number of known suitable monomers in various effective amounts, such as for example from about 10 to about 35, preferably from about 15 to about 25, and more preferably about 10 weight percent, can be selected for the process of the present invention including acrylates, methacrylates, vinyl fluorides, and the like, which monomer is usually selected in various effective amounts; for example, in an embodiment of the present invention from about 10 to about 25 weight percent and preferably about 18 weight percent. Examples of monomers include styrenes and functionalized styrenes, such as halogenated styrenes, methylated styrenes, and the like; methyl acrylate, ethyl acrylate, ethyl methacrylate, 2-ethyl hexyl acrylate, hydroxyethyl methacrylate, 2-ethoxyethyl methacrylate, butoxy ethoxy ethyl methacrylate, vinyl chloride, vinyl acetate, methacrylamide, vinyl pyrrolidone, and the like providing that the monomer selected is insoluble, or substantially insoluble in the solvent selected, which solvent can be comprised of water, alcohols, mixtures thereof, and the like.

Polymer products obtained with the process of the present invention include, for example, known polymers such as polymethyl methacrylate, polyvinylidene fluoride, and the like.

Examples of solvents for the emulsifier solution and the initiator solution include aliphatic alcohols, especially those with from about 1 to about 6 carbon atoms, such as ethanol, methanol, propanol, isopropanol butanol and the like, water, and mixtures thereof, which solvents are generally selected in various effective amounts to enable dissolution of the components involved, for example in amount of from about 60 to about 90 percent by weight and preferably from about 75 to about 85, and more preferably about 79 percent by weight. Other similar solvents can be selected. Alkali persulfate initiators include potassium, sodium and the like with potassium persulfate being preferred, and which sulfates are selected in various effective amounts, for example from about 0.25 to about 5 weight percent and preferably from about 0.5 to about 1.5 weight percent, and more preferably about 1 weight percent. Other initiators may include peroxides, such as hydrogen peroxide, benzoyl peroxide, lauryl peroxide and the like, azo-bis(isobutyronitrile) (AIBN), and mixtures of hydrogen peroxide and ascorbic acid, provided these initiators are soluble in the solvent system being used, which solvent could be water, an alcohol, or mixtures thereof as indicated herein.

Emulsifiers are known and include poly(vinyl alcohol), poly(acrylic acid), poly(ethylene oxide), mixtures of poly(ethylene oxide) and poly(propylene oxide), and the like selected in various effective amounts, such as for example from about 0.5 to about 5, preferably from about 1 to about 3, and more preferably about 2 weight percent.

The polymers obtained can be selected as carrier coatings, which can be prepared by a powder coating process, and wherein the carrier particles are comprised of a core with a coating thereover comprised of a mixture of polymers. More specifically, the carrier particles selected can be prepared by mixing low density porous magnetic, or magnetically attractable metal core carrier particles with from, for example, between about 0.05 percent and about 3 percent by weight, based on the weight of the coated carrier particles, of a mixture of polymers until adherence thereof to the carrier core by mechanical impaction or electrostatic attraction; heating the mixture of carrier core particles and polymers to a temperature, for example, of between from about 200° F. to about 550° F. for a period of from about 10 minutes to about 60 minutes enabling the polymers to melt and fuse to the carrier core particles; cooling the coated carrier particles; and thereafter classifying the obtained carrier particles to a desired particle size.

In a specific embodiment, the carrier particles can be comprised of a core with a coating thereover comprised of a mixture of a first dry polymer component and a second dry polymer component, which are not in close proximity in the triboelectric series. Therefore, the aforementioned carrier compositions can be comprised of known core materials including iron with a dry polymer coating mixture thereover. Subsequently, developer compositions of the present invention can be generated by admixing the aforementioned carrier particles with a toner composition comprised of resin particles and pigment particles.

Various known suitable solid core carrier materials can be selected. Characteristic core properties of importance include those that will enable the toner particles to acquire a positive charge or a negative charge, and carrier cores that will permit desirable flow properties in the developer reservoir present in the xerographic imaging apparatus. Also of value with regard to the carrier core properties are, for example, suitable magnetic characteristics that will permit magnetic brush formation in magnetic brush development processes, and also wherein the carrier cores possess desirable mechanical aging characteristics. Examples of carrier cores that can be selected include iron, steel, ferrites, magnetites, nickel, and mixtures thereof. Preferred carrier cores include ferrites, and sponge iron, or steel grit with an average particle size diameter of from between about 30 microns to about 200 microns.

Illustrative examples of polymer coatings that can be obtained with the processes of the present invention selected for the carrier particles include those that are not in close proximity in the triboelectric series. Specific examples of polymer mixtures used are polyvinylidenefluoride with polyethylene; polymethylmethacrylate and copolyethylenevinylacetate; copolyvinylidenefluoride tetrafluoroethylene and polyethylene; polymethyl methacrylate and copolyethylene vinylacetate; and polymethylmethacrylate and polyvinylidenefluoride. Other related polymer mixtures not specifically mentioned herein can be selected providing the objectives of the present invention are achieved, including, for example, polystyrene and tetrafluoroethylene; polyethylene and tetrafluoroethylene; polyethylene and polyvinyl chloride; polyvinyl acetate and tetrafluoroethylene; polyvinyl acetate and polyvinyl chloride; polyvinyl acetate and polystyrene; and polyvinyl acetate and polymethyl methacrylate.

With further reference to the polymer coating mixture, by close proximity as used herein it is meant that the choice of the polymers selected are dictated by their position in the triboelectric series, therefore, for example, one may select a first polymer with a significantly lower triboelectric charging value than the second polymer. For example, the triboelectric charge of a steel carrier core with a polyvinylidenefluoride coating is about $-75$ microcoulombs per gram. However, the same carrier, with the exception that there is selected a coating of polyethylene, has a triboelectric charging value of about $-17$ microcoulombs per gram. More specifically, not in close proximity refers to first and second polymers that are at different electronic work function values, that is they are not at the same electronic work function value; and further, the first and second polymers are comprised of different components. Additionally, the difference in electronic work functions between the first and second polymer is at least 0.2 electron volt, and preferably is about 2 electron volts; and moreover, it is known that the triboelectric series corresponds to the known electronic work function series for polymers, reference "Electrical Properties of Polymers", Seanor, D. A., Chapter 17, Polymer Science, A.D. Jenkins, Editor, North Holland Publishing (1972), the disclosure of which is totally incorporated herein by reference.

The percentage of each polymer present in the carrier coating mixture can vary depending on the specific components selected, the coating weight and the properties desired. Generally, the coated polymer mixtures used contains from about 10 to about 90 percent of the first polymer, and from about 90 to about 10 percent by weight of the second polymer. Preferably, there are selected mixtures of polymers with from about 40 to 60 percent by weight of the first polymer, and from about 60 to 40 percent by weight of a second polymer. In one embodiment of the present invention, when a high triboelectric charging value is desired, that is exceeding −50 microcoulombs per gram, there is selected from about 90 percent by weight of the first polymer such as polyvinylidenefluoride, and 10 percent by weight of the second polymer such as polyethylene. In contrast, when a lower triboelectric charging value is required, less than about −20 microcoulombs per gram, there is selected from about 10 percent by weight of the first polymer, and 90 percent by weight of the second polymer.

Also, there result, in accordance with a preferred embodiment of the present invention, carrier particles of relatively constant conductivities from between about $10^{-15}$ mho-cm$^{-1}$ to from about $10^{-9}$ mho-cm$^{-1}$ at, for example, a 10 volt impact across a 0.1 inch gap containing carrier beads held in place by a magnet; and wherein the carrier particles are of a triboelectric charging value of from −15 microcoulombs per gram to −70 microcoulombs per gram, these parameters being dependent on the coatings selected, and the percentage of each of the polymers used as indicated hereinbefore.

Various effective suitable means can be used to apply the polymer mixture coatings to the surface of the carrier particles. Examples of typical means for this purpose include combining the carrier core material, and the mixture of polymers by cascade roll mixing, or tumbling, milling, shaking, electrostatic powder cloud spraying, fluidized bed, electrostatic disc processing, and an electrostatic curtain. Following application of the polymer mixture, heating is initiated to permit flowout of the coating material over the surface of the carrier core. The concentration of the coating material powder particles, as well as the parameters of the heating step, may be selected to enable the formation of a continuous film of the coating material on the surface of the carrier core, or permit only selected areas of the carrier core to be coated. When selected areas of the metal carrier core remain uncoated or exposed, the carrier particles will possess electrically conductive properties when the core material comprises a metal. The aforementioned conductivities can include various suitable values. Generally, however, this conductivity is from about $10^{-9}$ to about $10^{-17}$ mho-cm$^{-1}$ as measured, for example, across a 0.1 inch magnetic brush at an applied potential of 10 volts; and wherein the coating coverage encompasses from about 10 percent to about 100 percent of the carrier core.

Illustrative examples of finely divided toner resins selected for the developer compositions include polyamides, epoxies, polyurethanes, diolefins, styrene acrylates, styrene methacrylates, styrene butadienes, vinyl resins and polymeric esterification products of a dicarboxylic acid and a diol comprising a diphenol. Specific monomers, which are subsequently polymerized, that can be selected include styrene, p-chlorostyrene vinyl naphthalene, unsaturated mono-olefins such as ethylene, propylene, butylene and isobutylene; vinyl halides such as vinyl chloride, vinyl bromide, vinyl fluoride, vinyl acetate, vinyl propionate, vinyl benzoate, and vinyl butyrate; vinyl esters like the esters of monocarboxylic acids including methyl acrylate, ethyl acrylate, n-butylacrylate, isobutyl acrylate, dodecyl acrylate, n-octyl acrylate, 2-chloroethyl acrylate, phenyl acrylate, methylalphachloracrylate, methyl methacrylate, ethyl methacrylate, and butyl methacrylate; acrylonitrile, methacrylonitrile, acrylamide, vinyl ethers, inclusive of vinyl methyl ether, vinyl isobutyl ether, and vinyl ethyl ether, vinyl ketones inclusive of vinyl methyl ketone, vinyl hexyl ketone and methyl isopropenyl ketone; vinylidene halides such as vinylidene chloride, and vinylidene chlorofluoride; N-vinyl indole, N-vinyl pyrrolidene; mixtures thereof; and other similar substances.

As one toner resin there can be selected the esterification products of a dicarboxylic acid and a diol comprising a diphenol, reference U.S. Pat. No. 3,590,000, the disclosure of which is totally incorporated herein by reference. Other toner resins include styrene/methacrylate copolymers; styrene/butadiene copolymers; polyester resins obtained from the reaction of bisphenol A and propylene oxide; and branched polyester resins resulting from the reaction of dimethylterephthalate, 1,3-butanediol, 1,2-propanediol and pentaerythritol.

Generally, from about 1 part to about 5 parts by weight of toner particles are mixed with from about 10 to about 300 parts by weight of the carrier particles.

Numerous well known suitable pigments or dyes can be selected as the colorant for the toner particles including, for example, carbon black, such as REGAL 330 ®, nigrosine dye, lamp black, iron oxides, magnetites, and mixtures thereof. The pigment, which is preferably carbon black, should be present in a sufficient amount to render the toner composition highly colored. Thus, the pigment particles are present in amount of from about 3 percent by weight to about 20 percent by weight, based on the total weight of the toner composition, however, lesser or greater amounts of pigment particles can be selected providing the objectives of the present invention are achieved.

When the pigment particles are comprised of magnetites, which are a mixture of iron oxides ($FeO.Fe_2O_3$) including those commercially available as MAPICO BLACK TM, they are present in the toner composition in an amount of from about 10 percent by weight to about 70 percent by weight, and preferably in an amount of from about 20 percent by weight to about 50 percent by weight.

The resin particles are present in a sufficient, but effective amount, thus when 10 percent by weight of pigment, or colorant such as carbon black is contained therein, about 90 percent by weight of resin material is selected. Generally, however, providing the objectives of the present invention are achieved, the toner composition is comprised of from about 85 percent to about 97 percent by weight of toner resin particles, and from about 3 percent by weight to about 15 percent by weight of pigment particles such as carbon black.

Also, colored toner compositions comprised of toner resin particles, carrier particles and as pigments or colorants, magenta, cyan and/or yellow particles, as well as mixtures thereof can be formulated. More specifically, illustrative examples of magenta materials that may be selected as pigments include 1,9-dimethyl-substituted quinacridone and anthraquinone dye identified in the Color Index as CI 60720, CI Dispersed Red 15, a diazo dye identified in the Color Index as Cl 26050, Cl Solvent Red 19, and the like. Examples of cyan materials that may be used as pigments include copper tetra-4-(octadecyl sulfonamido) phthalocyanine, X-copper phthalocyanine pigment listed in the Color Index as Cl 74160, Cl Pigment Blue, and Anthrathrene Blue, identified in the Color Index as Cl 69810, Special Blue X-2137, and the like; while illustrative examples of yellow pigments that may be selected are Diarylide Yellow 3,3-dichlorobenzidene acetoacetanilides, a monoazo pigment identified in the Color Index as Cl 12700, Cl Solvent Yellow 16, a nitrophenyl amine sulfonamide identified in the Color Index as Foron Yellow SE/GLN, Cl Dispersed Yellow 33, 2,5-dimethoxy-4-sulfonanilide phenylazo-4'-chloro-2,5-dimethoxy acetoacetanilide, Permanent Yellow FGL, and the like. These pigments are generally present in the toner composition an amount of from about 1 weight percent to about 15 weight percent based on the weight of the toner resin particles.

For further enhancing the positive charging characteristics of the developer compositions described herein, and as optional components there can be incorporated herein charge enhancing additives inclusive of alkyl pyridinium halides, reference U.S. Pat. No. 4,298,672, the disclosure of which is totally incorporated herein by reference; organic sulfate or sulfonate compositions, reference U.S. Pat. No. 4,338,390, the disclosure of which is totally incorporated herein by reference; distearyl dimethyl ammonium sulfate, reference U.S. Pat. No. 4,560,635 (D/83213), the disclosure of which is totally incorporated herein by reference; and other similar known charge enhancing additives. These additives are usually incorporated into the toner in an amount of from about 0.1 percent by weight to about 20 percent by weight.

The toner composition can be prepared by a number of known methods including melt blending the toner resin particles, and pigment particles or colorants of the present invention followed by mechanical attrition, and classification to enable toner particles with an average size diameter of from about 10 to about 20 microns. Other methods include those well known in the art such as spray drying, melt dispersion, dispersion polymerization, extrusion, and suspension polymerization. In one dispersion polymerization method, a solvent dispersion of the resin particles and the pigment particles are spray dried under controlled conditions to result in the desired product.

The toner and developer compositions may be selected for use in electrostatographic imaging processes containing therein conventional photoreceptors, including inorganic and organic photoreceptor imaging members. Examples of imaging members are selenium, selenium alloys, and selenium or selenium alloys containing therein additives or dopants such as halogens. Furthermore, there may be selected organic photoreceptors, illustrative examples of which include layered photoresponsive devices comprised of transport layers and photogenerating layers, reference U.S. Pat. No. 4,265,990, the disclosure of which is totally incorporated herein by reference, and other similar layered photoresponsive devices. Examples of generating layers are trigonal selenium, metal phthalocyanines, metal free phthalocyanines and vanadyl phthalocyanines. As charge transport molecules, there can be selected the aryl diamines disclosed in the '990 patent. Also, there can be selected as photogenerating pigments, squaraine compounds, thiapyrillium materials, titanyl phthalocyanines, and the like. Moreover, the developer compositions of the present invention are particularly useful in electrostatographic imaging processes and apparatuses wherein there is selected a moving transporting means and a moving charging means; and wherein there is selected a deflected flexible layered imaging member, reference U.S. Pat. Nos. 4,394,429 and 4,368,970, the disclosures of which are totally incorporated herein by reference.

The following examples are being supplied to further define the present invention, it being noted that these examples are intended to illustrate and not limit the scope of the present invention. Parts and percentages are by weight unless otherwise indicated.

EXAMPLE I

The following reactions were accomplished in a 250 milliliter round-bottom flask fitted with nitrogen gas inlet, water cooled condenser, and overhead mechanical stirrer. The flask was submerged in a constant temperature oil bath set at 70° C. To distilled water (75 grams) present in the flask was added Pluronic F-68 TM, an ethylene oxide/propylene oxide copolymer available from BASF (1.875 grams), and the mixture was stirred until a temperature of 70° C. was reached. A predissolved mixture of potassium persulfate (1.0 gram), available from BASF, in water (25 grams) was then added in one portion to the reaction flask stirred mixture. After a controlled equilibration time of twenty minutes had elapsed, the monomer methyl methacrylate (99 percent) (23.125 grams), available from Aldrich Chemical Company, was added in one portion. The reaction was then allowed to proceed for two hours at 70° C., at which time the milky white mixture resulting was cooled to room temperature, about 25° C., and the mixture was then poured in equal portions of about 30 milliliters each into 4×250 milliliter centrifuge bottles. The bottles were filled with about 150 milliliters of methanol and then centrifuged at 5,000 RPM for 10 minutes, and the clear, colorless supernatant decanted. The bottles were then filled with fresh methanol, about 150 milliliters, and the mixtures blended by a Polytron homogenizer for approximately 2 minutes until a homogeneous dispersion was observed. This redispersion, centrifugation and decanting process was repeated a total of two times using methanol and three times using the same amounts of deionized water. The contents of the four bottles were then combined and redispersed by homogenenizer in a total of 70 milliliters of deionized water. The solid poly(methyl methacrylate) was isolated by freeze drying to provide 17 grams (75 percent) of a dry white polymer powder. Particle size as measured by size average of 25 particles as seen on a SEM microphotograph, and with a caliper was determined to be 1 μm. Weight average molecular weight of the poly(methyl methacrylate) product determined as illustrated herein was found to be 482,000 and number average molecular weight was 126,000 as determined by GPC.

EXAMPLE II

The process of Example I was repeated with the exception that an equilibrium period of 14 minutes was selected between the addition of initiator and monomer. There resulted polymer particles with a weight average molecular weight of 542,000, and number average molecular weight was 131,000. Particle size was found to be 0.4 micron for the poly(methyl methacrylate).

EXAMPLE III

The procedure of Example I was repeated with the exception that an equilibrium period between addition of initiator and monomer was about 11 minutes. There resulted polymer particles with a weight average molecular weight of 619,000, and number average molecular weight was 159,000. Particle size of the polymer product poly(methyl methacrylate) was about 0.3 micron.

Particle sizes and molecular weights for Examples II and III were determined as illustrated with reference to Example I, or as disclosed herein.

Other modifications of the present invention may occur to those skilled in the art based upon a reading of the present disclosure and these modifications are intended to be included within the scope of the present invention.

What is claimed is:

1. A process for the preparation of polymers consisting essentially of dissolving a block copolymer emulsifier in a solvent selected from the group consisting of an aliphatic alcohol with 1 to about 6 carbon atoms, water, and mixtures thereof, followed by heating the mixture formed; adding to the mixture an alkali persulfate initiator dissolved in a solvent selected from the group consisting of aliphatic alcohol with 1 to about 6 carbon atoms, water, and mixtures thereof; subsequently adding monomer thereto, which monomer is not miscible with said solvent selected from the group consisting of aliphatic alcohol with 1 to about 6 carbon atoms, water, and mixtures thereof, and wherein the monomer is added after a period of time of from about 10 minutes to about 60 minutes has elapsed after the addition of said dissolved initiator; and thereafter effecting polymerization.

2. A process in accordance with claim 1 wherein the monomer is methylmethacrylate.

3. A process in accordance with claim 1 wherein the emulsifier is comprised of a block copolymer of ethylene oxide/propylene oxide.

4. A process in accordance with claim 1 wherein heating is accomplished at a temperature of from about 50° to about 100° C.

5. A process in accordance with claim 1 wherein heating is accomplished at a temperature of 70° C.

6. A process in accordance with claim 1 wherein the initiator is potassium persulfate.

7. A process in accordance with claim 1 wherein an aqueous solution of dissolved initiator is added to a preheated solution of emulsifier in water and allowed to stir at 70° C. for a time period of from about 5 minutes to about 25 minutes.

8. A process in accordance with claim 7 wherein stirring is accomplished for from about 10 to about 15 minutes prior to the addition of the monomer.

9. A process in accordance with claim 1 wherein the polymer particles have an average diameter of from about 0.3 to about 1 micron.

10. A process in accordance with claim 1 wherein subsequent to polymerization isolation of the polymer is accomplished by filtration after cooling.

11. A process in accordance with claim 1 wherein the amount of initiator selected is from about 0.5 to about 5 weight percent based on the weight of the monomer.

12. A process in accordance with claim 1 wherein the amount of initiator selected is from about 0.1 to about 2 weight percent based on the weight of the monomer.

13. A process in accordance with claim 1 wherein the amount of monomer selected is from about 10 to about 25 weight percent based on the weight of the emulsifier solvent and the initiator solvent.

14. A process in accordance with claim 1 wherein the reaction mixture, excluding solvent, contains from about 0.5 to about 5 weight percent of emulsifier; about 0.1 to 2 weight percent of initiator; and about 10 to about 25 weight percent of monomer.

15. A process in accordance with claim 1 wherein the amount of emulsifier selected is about 1.5 weight percent based on the weight of the monomer.

16. A process in accordance with claim 1 wherein the amount of initiator selected is about 0.8 weight percent based on the weight of the monomer.

17. A process in accordance with claim 1 wherein the amount of monomer selected is about 18 weight percent based on the weight of the emulsifier solvent and the initiator solvent.

18. A process in accordance with claim 1 wherein the solvent is water present in an amount of about 80 weight percent based on the total weight of all components present.

19. A process in accordance with claim 1 wherein the time between the addition of initiator and monomer is from about 10 minutes to about 30 minutes.

20. A process in accordance with claim 19 wherein the weight average molecular weight of the polymer is from about 300,000 to about 750,000.

21. A process in accordance with claim 20 wherein the glass transition temperature of the polymer product is about 126° C.

22. A process in accordance with claim 1 wherein the solvent for the emulsifier and the solvent for the initiator is water.

23. A process in accordance with claim 1 wherein the solvent for the emulsifier and the solvent for the initiator is comprised of a mixture of water and said aliphatic alcohol.

24. A process in accordance with claim 1 wherein polymerization is accomplished by heating.

25. A process in accordance with claim 1 wherein the monomer is added 20 minutes after the addition of initiator solution.

26. A process in accordance with claim 1 wherein the monomer is methylmethacrylate and is added 10 minutes after the addition of initiator solution resulting in a polymer polymethylmethacrylate with a weight average molecular weight of about 627,000 and an average diameter of about 0.29 micron.

27. A process in accordance with claim 1 wherein the monomer is methylmethacrylate and is added 15 minutes after the polymethylmethacrylate with a weight average molecular weight of about 539,000 and an average diameter of about 0.51 micron.

28. A process in accordance with claim 1 wherein the monomer is methylmethacrylate and is added 20 minutes after the addition of initiator solution resulting in a polymer polymethylmethacrylate with a weight average molecular weight of about 482,000 and an average diameter of about 0.98 micron.

29. A process in accordance with claim 1 wherein the components are added to a reactor and polymerization is accomplished in said reactor.

30. A process in accordance with claim 29 wherein subsequent to polymerization the reaction mixture is allowed to cool and there is isolated therefrom said polymers, the solvent for the emulsifier and for the initiator is water, the monomer is methyl methacrylate, and the emulsifier is ethylene oxide/propylene oxide.

* * * * *